United States Patent [19]
Van Order

[11] Patent Number: 5,508,897
[45] Date of Patent: Apr. 16, 1996

[54] OVERHEAD LAMP ASSEMBLY

[75] Inventor: Kim L. Van Order, Hamilton, Mich.

[73] Assignee: Prince Corporation, Holland, Mich.

[21] Appl. No.: 222,658

[22] Filed: Apr. 1, 1994

[51] Int. Cl.⁶ ........................................ B60Q 3/02
[52] U.S. Cl. .............. 362/80; 362/74; 362/83.3; 362/287
[58] Field of Search .............................. 362/74, 80, 83.3, 362/268, 269, 285, 287, 311, 364, 418, 372

[56] References Cited

U.S. PATENT DOCUMENTS

| | | | |
|---|---|---|---|
| 2,225,401 | 12/1940 | Levy | 362/269 |
| 2,249,357 | 7/1941 | Graham . | |
| 2,957,073 | 10/1960 | Legge | 362/80 |
| 3,953,724 | 4/1976 | Ouchi . | |
| 4,100,591 | 7/1978 | Schael | 362/285 |
| 4,182,532 | 1/1980 | Walker, Sr. | 362/74 |
| 4,336,579 | 6/1982 | Lord . | |
| 4,499,528 | 2/1985 | Hawlitzki . | |
| 4,686,609 | 8/1987 | Dykstra et al. . | |
| 5,070,434 | 12/1991 | Suman et al. . | |

Primary Examiner—Ira S. Lazarus
Assistant Examiner—Y. Quach
Attorney, Agent, or Firm—Price, Heneveld, Cooper, DeWitt & Litton

[57] ABSTRACT

A lamp assembly includes a light transmissive diffusion plate having at least one lens positioned therein and a movable light source which can selectively be moved from a position aligned with the lens for providing spot lighting or positioned behind the diffusion plate for providing general interior illumination for the vehicle. In a preferred embodiment of the invention, a circuit board includes a light source mounted thereon and electrical contacts and is rotatably coupled behind a diffusion plate by a control knob extending through the diffusion plate and accessible to the vehicle operator such that by rotation of the knob, the light source is selectively moved between at least one spotlighting position and a diffuse lighting position.

26 Claims, 3 Drawing Sheets

OVERHEAD LAMP ASSEMBLY

BACKGROUND OF THE INVENTION

The present invention pertains to an overhead lamp assembly for use in a vehicle and particularly to a multi-purpose courtesy light for use in providing general lighting as well as selectable spot lighting for one or more sides of the vehicle.

Courtesy lights are commonly used in vehicles to provide interior lighting for vehicles for entrance and egress and are activated upon opening of a door or, more recently, by the transmission of a keyless entry code from a key fob which unlocks the doors and illuminates the interior of the vehicle.

Overhead consoles frequently integrally include such courtesy lights for providing diffuse general illumination and in some instances include spot lighting which is selectively used for reading maps or other reading material without distracting the driver. In some instances, the driver also needs focused lighting for reading material when the vehicle is not in operation. Accordingly, both diffuse lighting for general illumination of the interior of the vehicle and spot lighting for either the driver or passenger side is desirable and has been provided by a number of different lighting arrangements in commercial use. U.S. Pat. No. 5,070,434 discloses a dual functioning light fixture which provides both diffuse and spot lighting which id directable. Further, U.S. Pat. No. 4,686,609 also discloses a selectable lighting control integrated in a grabhandle assembly in which a bulb is in a fixed location and a selectable light control panel is moved in front of the bulb for providing diffuse or spot lighting therefrom.

SUMMARY OF THE PRESENT INVENTION

The system of the present invention improves upon the prior art dual lighting systems by providing a fixed light transmissive diffusion plate having at least one lens positioned therein and a movable light source which can selectively be moved from a position aligned with the lens for providing spot lighting or positioned behind the diffusion plate for providing general interior illumination for the vehicle. In a preferred embodiment of the invention, a circuit board includes a light source mounted thereon and electrical contacts and is rotatably coupled behind a diffusion plate by a control knob extending through the diffusion plate and accessible to the vehicle operator such that by rotation of the knob, the light source is selectively moved between at least one spotlighting position and a diffuse lighting position.

In a preferred embodiment of the invention, the diffusion plate includes a pair of spaced lenses aligned to direct light on either the passenger or driver side such that a single light assembly can selectively provide spot lighting either side of the vehicle or general interior illumination.

Such construction provides a relatively inexpensive and yet durable and highly functional light control system for use in a vehicle overhead and one which provides multiple desired lighting effects. These and other features, objects and advantages of the present invention will become apparent upon reading the following description thereof together with reference to the accompanying drawings in which:

DETAILED DESCRIPTION OF THE PREFERRED EMBODIMENT

Figure 1:
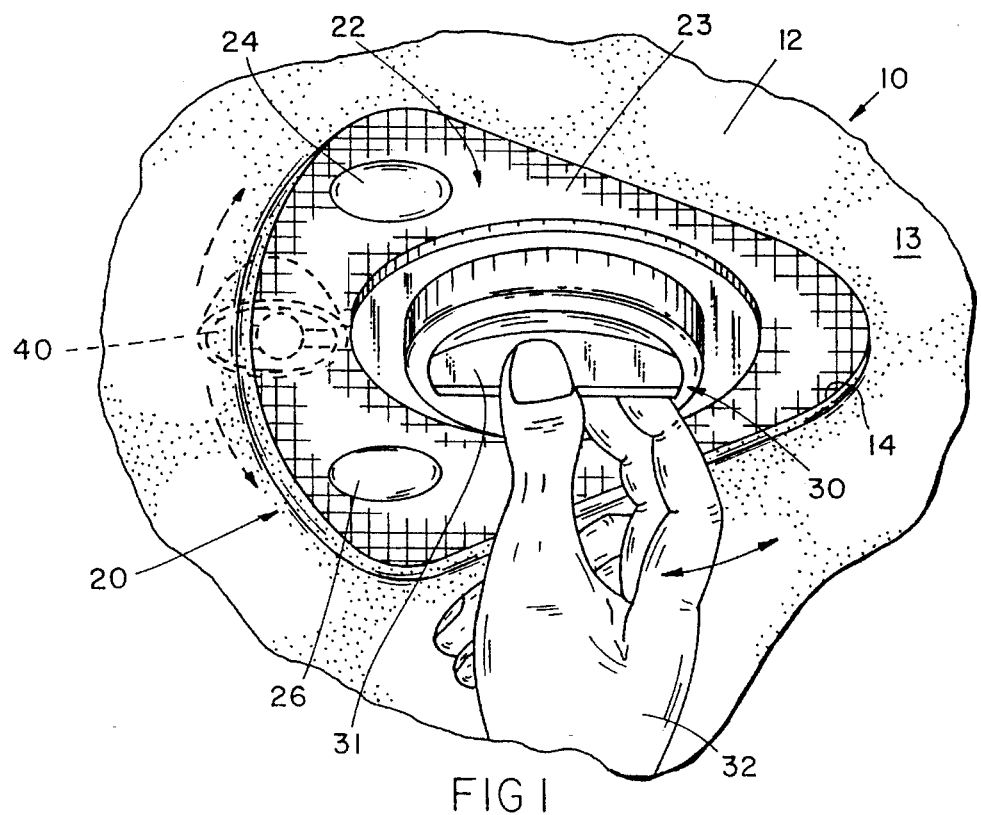
FIG. 1 is a fragmentary perspective view of a vehicle overhead showing a lamp assembly embodying the present invention.
Figure 2:
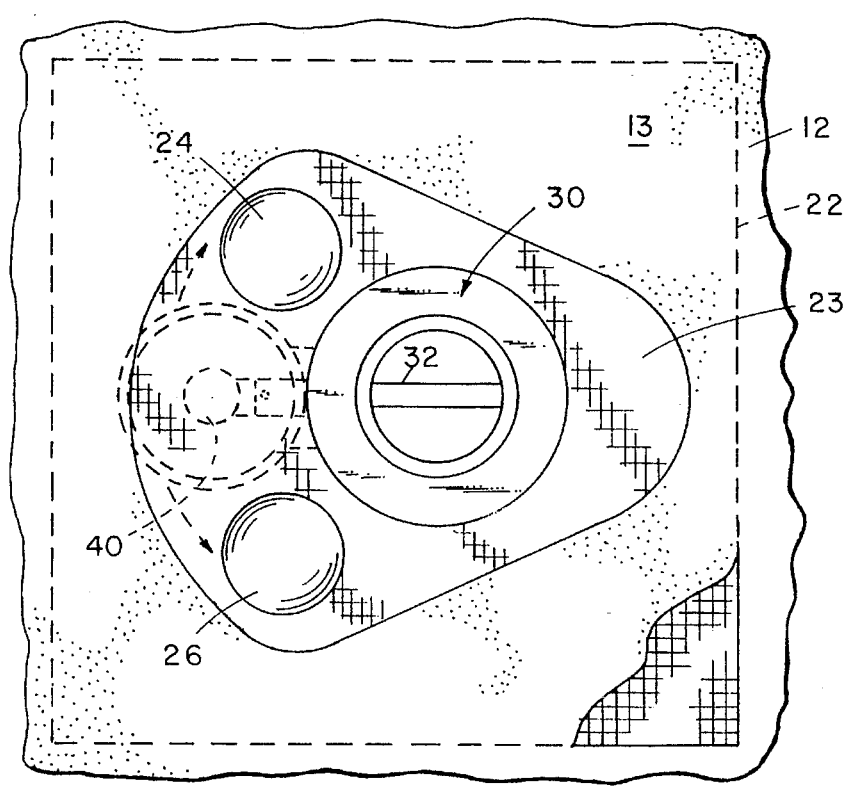
FIG. 2 is a fragmentary bottom plan view of the lamp assembly shown in FIG. 1.

Referring initially to FIGS. 1 and 2, there is shown a vehicle 10 such as an automobile having a structural roof covered by an integrated headliner 12 covered by a fabric or other upholstery material 13 to provide a trim appearance to the vehicle. Mounted to the headliner, which can be of a construction in common commercial use, in a location typically between the driver and passenger side seats slightly forwardly thereof, is a lamp assembly 20 of the present invention.

Lamp assembly 20 includes a generally rectangular diffusion plate 22 (FIGS. 2 and 3) which is fixedly mounted to the top surface of the headliner 12 over a generally triangular shaped aperture 14 to present a recessed appearance. The diffusion plate 22 is made of a clear polymeric material such as polycarbonate and has a textured grid 23 on its upper surface to diffuse light from a lamp 40 shown in phantom form in FIG. 1. Mounted in spaced relationship in the left and right forward apices of the triangular diffusion plate 22 are a first focusing lens 24 and a second lens 26 which can be conventional lenses designed to focus light from lamp 40 when aligned above either of the lenses into a spot at the lap area of either the passenger or driver side of the vehicle. Lenses 24 and 26 are secured in apertures formed in the diffusion plate by suitable bonding adhesives or preferably integrally molded as part of the diffusion plate for directing illumination toward the driver's side through lens 24 or the passenger side through lens 26 as lamp 40 is moved in alignment with either of the lenses.

As seen in FIG. 1, the lamp assembly 20 further includes a control knob 30 which can be grasped by the hand 32 of the user and for such purpose includes a vertically extending handle 31 to allow rotation of the lamp 40 between select positions in alignment with either lens 24, lens 26 or an intermediate position above the diffusion plate 22 as illustrated in FIG. 2 for providing diffuse illumination for the vehicle interior. Having briefly described the overall operation of the lamp assembly 20 of the present invention, a detailed description of the construction of the lamp assembly is presented in initially connection with FIGS. 3–5.

Figure 4:
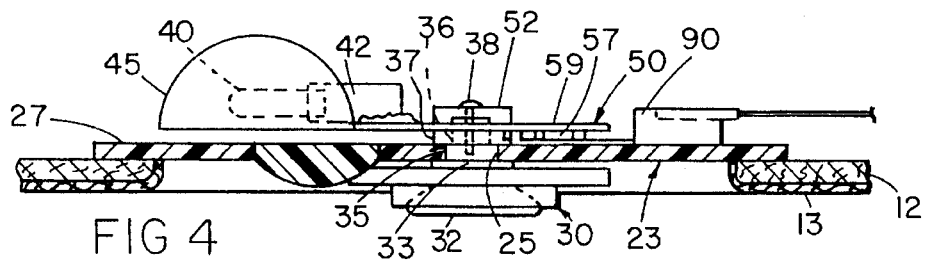
FIG. 4 is a cross-sectional view of the lamp assembly shown in FIGS. 1–3 taken along section line IV—IV in FIG. 3.

The lamp assembly 20 includes a lamp sub-assembly comprising knob 30, circuit board 50 including its associated electrical components described below, and lamp 40. The diffusion plate 22 includes an aperture 25 (FIG. 4)

through which a circular shaft 35 integral with knob 30 extends. Integrally formed at the end of circular shaft 35 associated with knob 30 is a square end 36 having a width less than the diameter of shaft 35 to form a land 31' (FIG. 5) at their interface. End 36 defines a key which extends into a square aperture 56 in the circular circuit board 50 (FIG. 5) such that rotation of knob 30 rotates the circuit board 50. A spacer washer 37 extends between the upper surface 27 of diffusion plate 22 and the lower surface 57 of circuit board 50 as best seen in FIG. 4 and has a diameter greater than that of aperture 25 for holding the circuit board in spaced relationship to the top of plate 22. Washer 37 thus provides a rotating sliding interface between plate 22 and the rotatable lamp assembly. A second washer 52 extends over the top surface 59 of circuit board 50 and compressibly secures the circuit board 50 to knob shaft 35 between washer 37 seated on hind 31 and the lower surface of washer 52 by means of a fastener such as a screw 38. Another spacer washer 33 (FIG. 4) extends between the top of knob 30 and the underside of plate 22. This washer however could be integrally molded as part of the knob and serves to minimize the surface contact between knob 30 and plate 22. The spacing between the upper surface of washer 33 and the lower surface of washer 37 is selected by the forming of land 31' and end 36 such that knob can move in a controlled rotating fashion without excessive slack. A silicon grease lubricant can be employed a the interface between plate 22 and the moving parts if desired. Such arrangement therefore rotatably couples the lamp sub-assembly to the diffusion plate 22 such that the circuit board rotates together with lamp 40 attached thereto, as described below, to position the lamp in the selected use positions.

Figure 3:
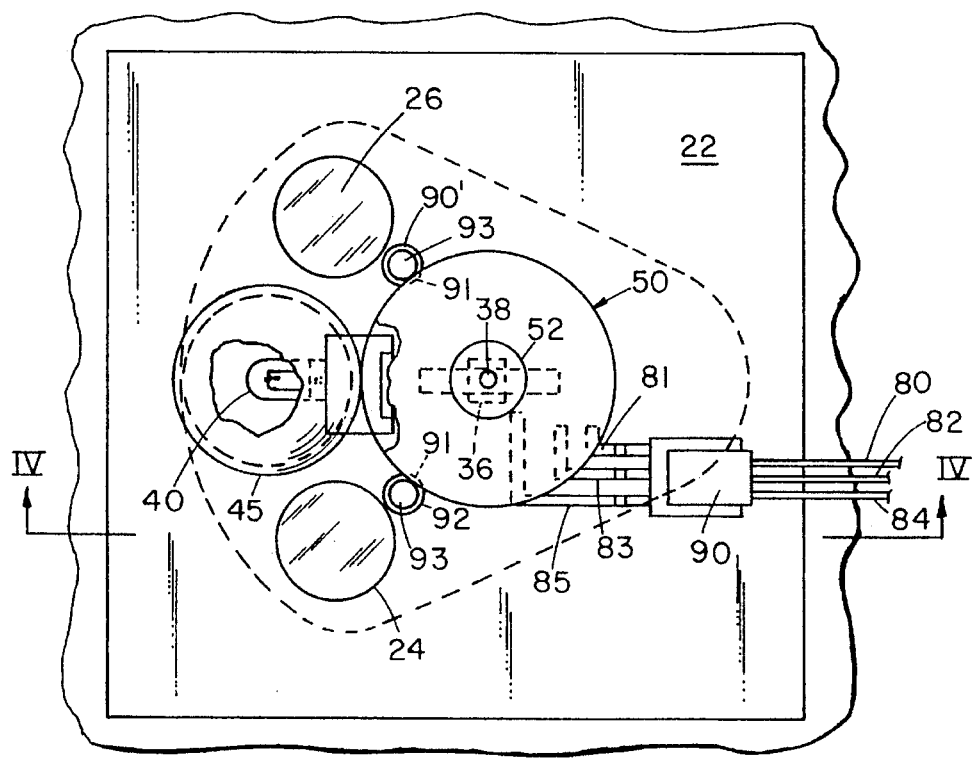
FIG. 3 is a top plan view of the lamp assembly shown in FIGS. 1 and 2, partly broken away, and viewed from the roof side of the vehicle.
Figure 5:
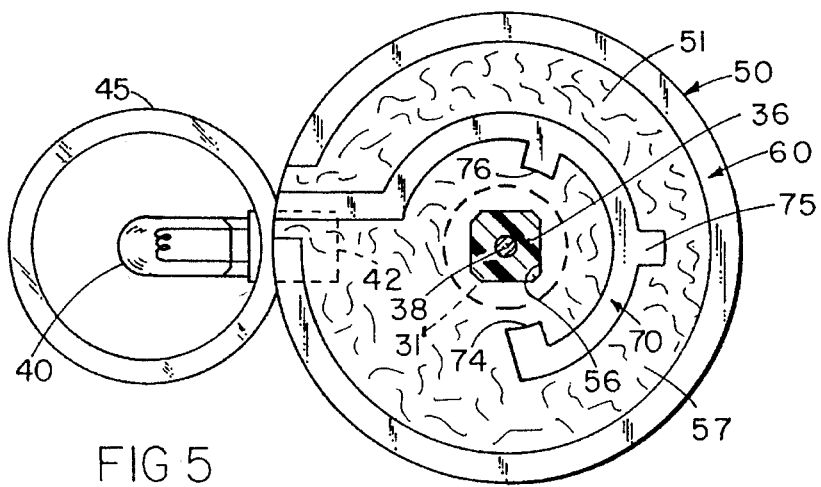
FIG. 5 is an enlarged bottom plan view, partly in cross-section, of the circuit board and lamp assembly shown in FIGS. 3 and 4.

The circuit board 50 is made of a conventional insulative substrate 51 (FIG. 5) to which a pair of concentric ring conductors 60 and 70 are printed on the lower surface thereof as best seen in FIG. 5. Bulb 40 is a standard 12 volt electrical bulb mounted in a socket 42 having one contact of bulb engaging the outer concentric contact 60 of the circuit board which extends around the outer periphery of the circuit board and defines the ground contact for the electrical circuit. Associated with socket 42 and bulb 40 is a hemispherical reflector 45 for reflecting light from lamp 40 downwardly through the diffusion plate 22 or lenses 24 and 26 which are radially spaced such that the filament associated with bulb 40 are aligned with the center of the lenses 24 and 26 as the lamp moves around the pivot point defined by the center of shaft 35 of knob 30. Electrical power is selectively applied to the remaining contact of lamp 40 through the inner circular contact 70 which includes inwardly projecting contacts 74 and 76 for providing operating power to lamp 40 when the lamp is aligned with lenses 24 and 26 respectively and a third outwardly projecting contact tab 75 for providing electrical operating power to lamp 40 when it is aligned in a position between lenses 24 and 26 as shown in FIGS. 2 and 3 to provide diffuse lighting.

Electrical operating power from the vehicle's electrical system is supplied to the circuit board contacts by three conductors 80, 82 and 84 as seen FIGS. 3, 6, and 7A–C with conductor 80 being coupled to the vehicle's ground system and which is coupled to contact ring 60 by means of a spring wiper contact made of beryllium copper and extending from a terminal block 90 coupling each of the conductors 80, 82 and 84 to their associated wiper spring arms 81, 83 and 85 respectively. Block 90 is mounted to the upper surface or the diffusion plate 22 immediately adjacent the outer peripheral rim of circuit board 50 as best seen in FIG. 4 to position the generally L-shaped wiper contacts in selective alignment with contact ring 60 and contact tabs 74, 75 and 76 on contact ring 70.

Figure 6:
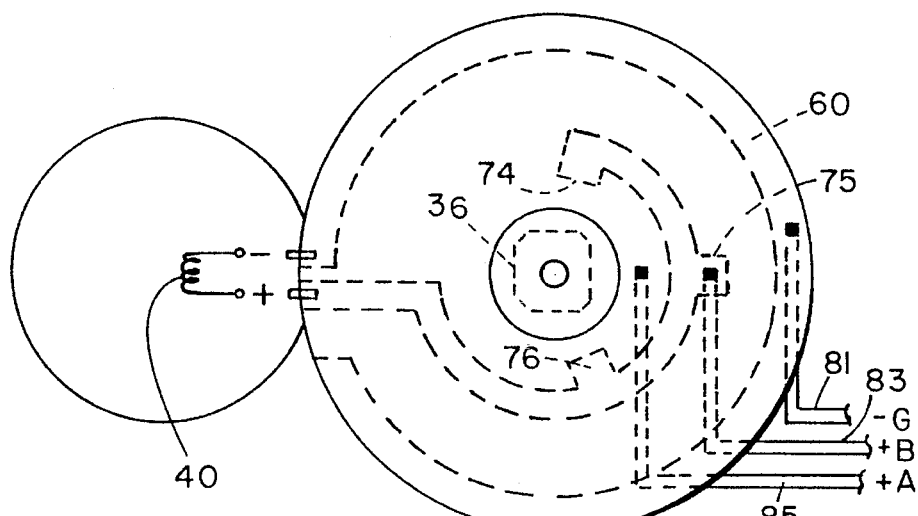
FIG. 6 is a pictorial and schematic electrical circuit diagram of the circuit means associated with the lamp assembly of the present invention.

Power from the vehicle's electrical system power is applied continuously to conductor 84 and wiper arm 85 such that whenever desired, lamp 40 can be actuated by rotating knob 30 to position contact tabs 74 or 76 in conductive relationship with wiper arm 85 coupled to electrical conductor 84 for providing spot lighting for the vehicle whenever desired. Conductor 82 of the vehicle electrical system is associated with the vehicle door switches and an instrument panel switch or other vehicle electrical control circuit for providing courtesy illumination upon opening of the doors, upon operator selection, or upon operation of a keyless entry system for unlocking the doors. Thus, power will be applied to conductor 82 selectively for providing diffuse illumination via spring arm 83 and its coupling to contact tab 75 as illustrated in FIG. 6 and FIG. 7A.

Figures 7A, 7B:
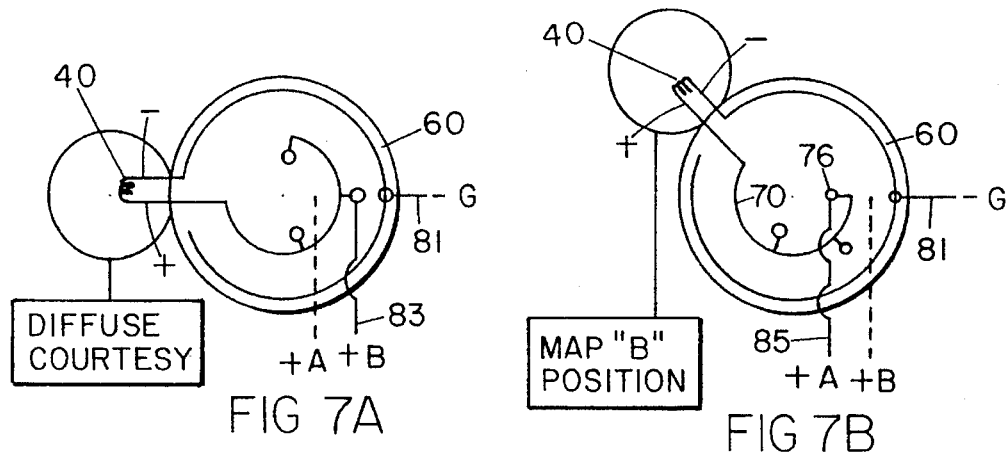
FIGS. 7A–7C are pictorial and schematic electrical circuit diagrams illustrating the interrelationship of the electrical circuit components to provide operating power for the lamp in the various operating positions of the lamp assembly.
Figure 7C:
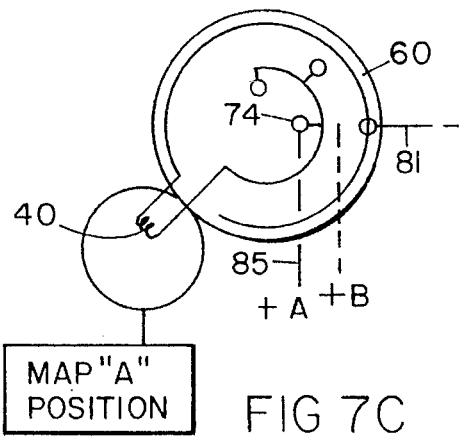

The circuit operation for providing spot lighting to the driver's side is illustrated in FIG. 7C where arm finger 85 engages tab 74 to complete the electrical circuit for lamp 40 or, as seen in FIG. 7B for the passenger side where conductive arm 85 contacts conductive tab 76 of conductor 70 for completing the electrical circuit when lamp 40 is positioned over lens 26 aligned to direct light to the passenger side of the vehicle. For purposes of supporting circuit board 50 with respect to diffusion plate 22 and for assisting in the alignment of lamp 40 with respect lenses 24 and 26, support posts 90, and 92 (FIG. 3) may be provided with a lower shoulder portion 91 underlying the circuit board for providing support for the lower outer peripheral surface thereof. Upstanding posts 93 engage the peripheral edge of the disk-shaped circuit board controlling its rotation. Detent means (not shown) in the form of a spring arm or the like which engages notches or posts on the circuit board can also be provided for indexing the lamp assembly in any of the selected use positions providing the operator with a feel for the alignment of bulb 40 with respect to either lens 24 or 26 or an intermediate position in which diffuse lighting is provided although the handle 31 when aligned in a forward and aft longitudinal alignment with a vehicle provides such tactile indexing and the illumination of the lamp 40 when aligned with either of the lenses 24 or 26 also provides the operator with sufficient control of the lamp assembly without such detent means. The arcuate coverage provided by each of the tabs 74, 75 and 76 on inner contact ring 70 provides sufficient angular coverage for the positioning of knob 30 for the desired lamp operation.

Thus, there is provided a lamp assembly in which a rotatable circuit board and lamp mounted to a peripheral edge thereof is movable with respect to a diffusion plate having at least one lens mounted thereto such that both spot and diffuse lighting can be provided by rotation of the lamp utilizing a control knob which is readily accessible to the vehicle operator. It will become apparent to those skilled in the art that various modifications to the preferred embodiment of the invention as described herein can be made without departing from the spirit or scope thereof as defined by the appended claims.

The embodiments of the invention in which an exclusive property or privilege is claimed are defined as follows:

1. A lamp assembly for use in a vehicle having an interior, said lamp assembly comprising:

a light diffusion plate associated with said lamp assembly and including at least one light focusing lens; and an electrical circuit board including a lamp, said circuit board movably coupled to said light diffusion plate and selectively moveable between a first position with said lamp aligned with said lens to provide spot lighting to the interior of a vehicle and a second position with said lamp located in alignment with said diffusion plate to provide diffuse light to the interior of the vehicle.

2. The lamp assembly as defined in claim 1 and further including a control extending from a side of said light diffusion plate opposite said circuit board through said light diffusion plate and coupled to said circuit board for moving said circuit board and lamp thereon between said first and second positions.

3. The lamp assembly as defined in claim 2 wherein said circuit board is circular and wherein said control is a knob having a shaft coupled to said circuit board and extending through said diffusion plate for rotating said circuit board.

4. The lamp assembly as defined in claim 3 wherein said diffusion plate includes a pair of spaced lenses and wherein said circuit board can be rotated by said knob to selectively position said lamp in alignment with either of said lenses.

5. A lamp assembly for use in a vehicle having an interior, said lamp assembly comprising:

a light control member associated with said lamp assembly and including at least one lens and a diffusion plate positioned and spaced relationship to said lens;

a lamp sub-assembly including a lamp, said sub-assembly movably coupled to said light control member and selectively moveable between a first position with said lamp aligned with said lens to provide spot lighting to the interior of a vehicle and at least a second position with said lamp located in alignment with said diffusion plate to provide diffuse light to the interior of the vehicle; and said lamp sub-assembly further including a control for allowing a user to move said lamp between at least said first and second positions.

6. The lamp assembly as defined in claim 5 wherein said lamp sub-assembly includes a circuit board having electrical conductors formed thereon and wherein said lamp is electrically coupled to said conductors of said circuit board.

7. The lamp assembly as defined in claim 6 wherein said circuit board further includes contact tabs at spaced locations on at least one of said conductors.

8. The lamp assembly as defined in claim 7 wherein said lamp sub-assembly further includes at least one wiper arm positioned on said diffusion plate to selectively engage said contact tabs as said lamp sub-assembly is moved.

9. The lamp assembly as defined in claim 8 wherein a plurality of wiper arms include conductors for coupling said wiper arms to a vehicle's electrical system.

10. The lamp assembly as defined in claim 9 wherein said lamp sub-assembly is rotatably coupled to said diffusion plate.

11. The lamp assembly as defined in claim 10 wherein said circuit board is disk-shaped.

12. The lamp assembly as defined in claim 11 wherein said contact tabs on said circuit board are annular concentric rings.

13. The lamp assembly as defined in claim 12 and further including a knob having a shaft extending through said diffusion plate and coupled to said circuit board, and means for rotatably supporting said circuit board and knob to said diffusion plate.

14. The lamp assembly as defined in claim 13 wherein said light control member comprises said diffusion plate and a pair of spaced lenses positioned to provide selective spot lighting to occupants of the vehicle.

15. The lamp assembly its defined in claim 14 wherein said diffusion plate and said lenses are integrally molded.

16. The lamp assembly as defined in claim 15 and further including a reflector coupled to an edge of said circuit board and extending in alignment with said lamp to direct light from said lamp toward said light control member.

17. The lamp assembly as defined in claim 5 wherein said lamp sub-assembly is rotatably coupled to said diffusion plate.

18. The lamp assembly as defined in claim 17 wherein said light control member comprises said diffusion plate and a pair of spaced lenses positioned to provide selective spot lighting to occupants of the vehicle.

19. The lamp assembly as defined in claim 18 wherein said diffusion plate and said lenses are integrally molded.

20. The lamp assembly as defined in claim 5 and further including a knob extending on a side of said light control member for access by a vehicle occupant.

21. The lamp assembly as defined in claim 20 wherein said lamp sub-assembly is rotatably coupled to said light control member.

22. A lamp assembly for use in a vehicle having an interior, said lamp assembly comprising:

a light control member mounting to a vehicle, said light control member having a first surface facing the interior of the vehicle, said light control member including a diffusion plate and at least one lens;

a lamp movably mounted to said light control member on a side opposite said first surface and selectively moveable between a first position aligned with said lens to provide spot lighting to the interior of the vehicle and at least a second position located in alignment with said diffusion plate to provide diffuse light to the interior of the vehicle; and an electrical circuit coupled to said lamp for providing electrical power to said lamp when in said first and second positions.

23. The lamp assembly as defined in claim 22 wherein said electrical circuit includes a circuit board to which said lamp is mounted and wherein said circuit board is rotatably mounted to said diffusion plate.

24. The lamp assembly as defined in claim 23 and further including a knob extending from a side of said diffusion plate opposite said circuit board and having a shaft extending through said diffusion plate and coupled to said circuit board for rotating said circuit board and lamp thereon between said first and second positions.

25. The lamp assembly as defined in claim 24 and further including electrical contact on said circuit board and on said diffusion plate for supplying electrical operating power to said lamp only when aligned in predetermined positions in alignment with said lens and said diffusion plate.

26. A lamp assembly for use in a vehicle having an interior, said lamp assembly comprising:

a light diffusion plate associated with said lamp assembly including a pair of spaced light focusing lenses; and an electrical circuit board including a lamp, said circuit board movably coupled to said light diffusion plate and selectively moveable between a first position with said lamp aligned with one of said lenses to provide spot lighting to the interior of a vehicle, a second position with said lamp located in alignment with said diffusion plate to provide diffuse light, and a third position aligned with the other of said lenses to provide spot lighting to a different area of the interior of the vehicle.

* * * * *

UNITED STATES PATENT AND TRADEMARK OFFICE
CERTIFICATE OF CORRECTION

PATENT NO. : 5,508,897
DATED : April 16, 1996
INVENTOR(S) : Kim L. Van Order

It is certified that error appears in the above-identified patent and that said Letters Patent is hereby corrected as shown below:

Column 1, line 28;
"id" should be --is--.

Column 1, line 49;
"spotlighting" should be --spot lighting--.

Column 2, line 63;
"in initially" should be --initially in--.

Column 3, line 17;
"hind" should be --land--.

Column 3, line 17;
"31" should be --31'--.

Column 3, line 25;
"knob can" should be --knob 30 can--.

Column 3, line 27;
"a" should be --at--.

Column 3, line 58;
After "seen" insert --in--.

Column 4, line 19;
Delete "finger".

Column 4, line 28;
"90," should be --90'--.

UNITED STATES PATENT AND TRADEMARK OFFICE
CERTIFICATE OF CORRECTION

PATENT NO. : 5,508,897
DATED : April 16, 1996
INVENTOR(S) : Kim L. Van Order

It is certified that error appears in the above-identified patent and that said Letters Patent is hereby corrected as shown below:

Abstract, line 12;
        "spotlighting" should be --spot lighting--.

Signed and Sealed this

Twentieth Day of May, 1997

*Attest:*

BRUCE LEHMAN

*Attesting Officer*     *Commissioner of Patents and Trademarks*